No. 633,695. Patented Sept. 26, 1899.
G. HUMMEL.
MOTOR METER FOR THREE PHASE CURRENTS.
(Application filed Dec. 27, 1897.)
(No Model.) 2 Sheets—Sheet 1.
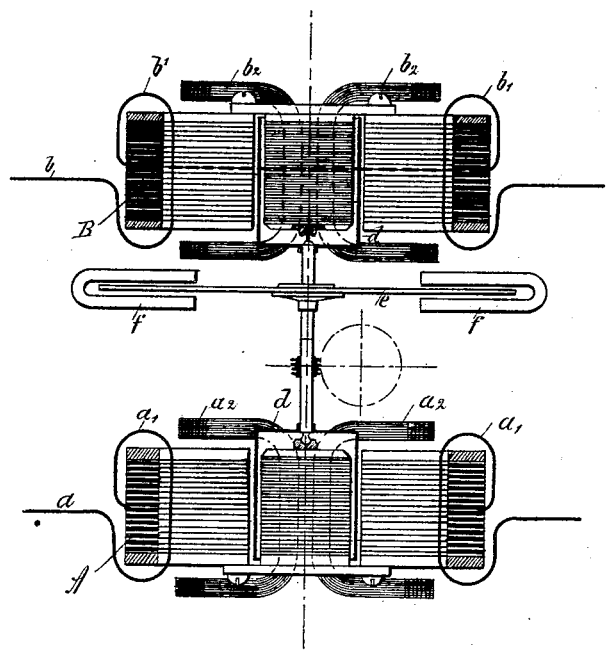
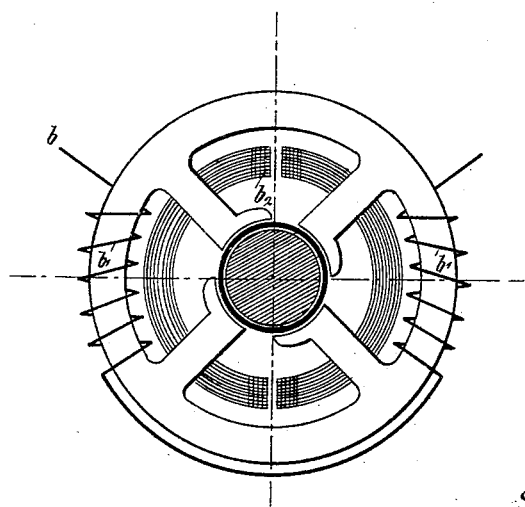
Witnesses
R. Aberli
Inventor
Georg Hummel
By
Briesen & Knauth
his Attorneys No. 633,695. Patented Sept. 26, 1899.
G. HUMMEL.
MOTOR METER FOR THREE PHASE CURRENTS.
(Application filed Dec. 27, 1897.)
(No Model.) 2 Sheets—Sheet 2.
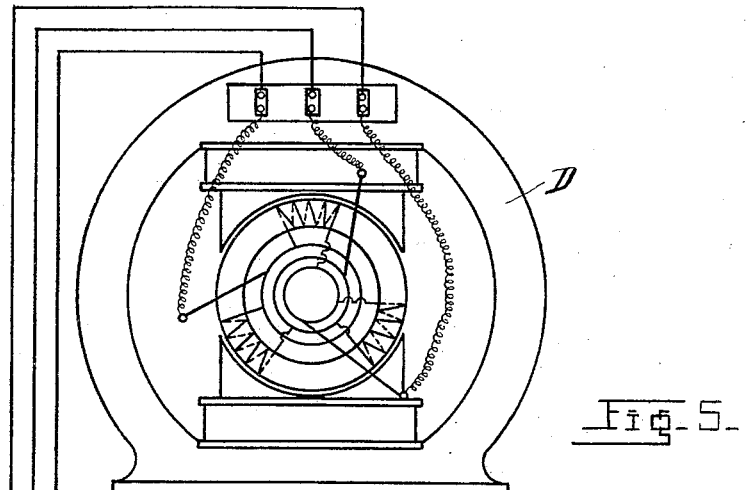
Fig. 5.
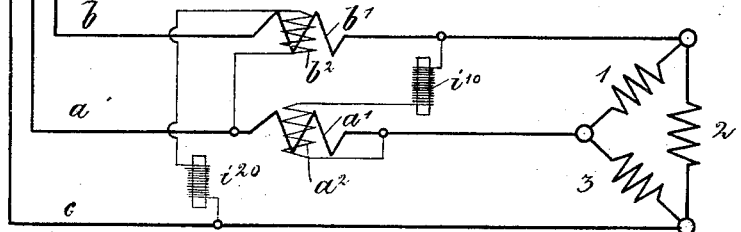
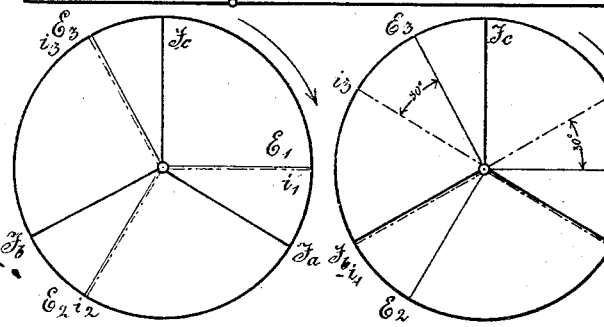
Fig. 3. Fig. 4.
Witnesses
R. Aberle
Geo. E. Moore
Inventor
Georg Hummel
By Briesen & Knauth
his Attorneys

UNITED STATES PATENT OFFICE.

GEORG HUMMEL, OF MUNICH, GERMANY.

MOTOR-METER FOR THREE-PHASE CURRENTS.

SPECIFICATION forming part of Letters Patent No. 633,695, dated September 26, 1899.

Application filed December 27, 1897. Serial No. 663,544. (No model.)

*To all whom it may concern:*

Be it known that I, GEORG HUMMEL, residing at Munich, in the Kingdom of Bavaria, German Empire, have invented certain new and useful Improvements in Motor-Meters for Three-Phase Currents, of which the following is a specification.

My invention relates primarily to motor-meters for measuring the energy of three-phase alternating currents, and has for its object to produce a three-phase motor which may be employed as a meter on three-phase circuits as used commercially.

The invention consists in a motor wherein the current-phase in some of the coils is shifted thirty degrees with respect to the tension.

In practically constructing the meter forming the subject of the present invention I preferably utilize for the constructive details thereof the principles described in United States Letters Patent Nos. 570,019 and 600,616 and that described in my application for United States Letters Patent for alternating-current meters filed the 18th day of November, 1897, Serial No. 658,959. As will be seen the invention is preferably embodied in a double-wound meter having a common rotating body for the two sets of windings.

My invention will be understood by referring to the accompanying drawings, which show clearly in an elementary manner a meter in which my invention is embodied, in which drawings—

Figures 1 and 2 are sectional and plan views, respectively, of a motor-meter. Figs. 3 and 4 are explanatory phase diagrams thereof, and Fig. 5 shows a dynamo and a diagrammatic view of the circuits which are employed in the meter.

Before entering into the mathematical demonstration I will describe the form of construction shown in Figs. 1, 2, and 5. In these figures, A and B are two stators as used in two-phase current-motors and which are wound as follows: In the stator B the main or series magnetic flux is created by the current which flows in the conductor $b$ or by a proportional part of the same and through winding $b'$ in series relation to the work-circuit, while the shunt magnetic flux is created by current which is proportional to the tension and in shunt relation to the work-circuit.

In Figs. 1 and 2, $b_1$ is the current or series winding of the stator B, and $b_2$ the tension or shunt winding thereof, the current-winding being shown as a ring-winding, while the tension-winding is shown as drum-winding. This form of construction is not essential so far as the principal is concerned and is only necessitated by manufacturing considerations. Therefore one could just as well construct both windings as ring-windings or both as drum-windings or the tension-winding as ring-winding and the current-winding as drum-winding without departing from the spirit of the invention. In the same way the stators could also be wound multipolar instead of bipolar, as shown. As in the case of stator B the stator A is also wound as a two-phase motor, $a_1$ being the current or series winding and $a_2$ the tension or shunt winding. Within the spaces in the stators A and B are the rotors $d \cdot d$ on a common arbor; but the rotors can also be constructed of one piece. Further, the rotors are provided with any kind of a damper, which is shown in Fig. 1 as a disk $e$ in combination with magnet $f$.

In Fig. 5 a three-phase dynamo D is shown as connected up $\triangle$ fashion and having extending therefrom mains $a\ b\ c$, which mains are at their ends connected $\triangle$ fashion by the primary or tension coils 1 2 3 in the usual manner of rotary field-transformers. The current-coil $a'$ is, as before explained, in series or series relation with the main $a$. The current-coil $b'$ is in series or series relation with the main $b$, the third main $c$ being unprovided with a current-coil. The shunt-coil $a^2$, coöperating with the coil $a'$, is connected across from the main $a$ to the main $b$ and across the tension or primary coil 1 through the inductance $i^{10}$, and the shunt-coil $b^2$ is connected across from the main $a$ to the main $c$ and across the tension or primary coil 3 through the inductance $i^{20}$. The shunt $a^2$ is shown as so combined with the tension 1 of the three-phase transformer as to effect a backward shift in its phase of thirty degrees, and the shunt-coil $b^2$ is combined with tension 3 in a similar manner.

The theory upon which a meter thus constructed and connected with a rotary current system operates is, I believe, as follows: It is well recognized that by measuring two currents and two tensions of a rotary current-transmission system the value of the energy developed in the system at any given instant may be correctly ascertained. If, for example, in Fig. 3 $J_a$ $J_b$ $J_c$ represent instantaneous values of the main currents in the mains $a$, $b$ $c$ $i_1$ $i_2$ $i_3$ the instantaneous values of the currents in the shunt-windings of the meter, and $E_1$ $E_2$ $E_3$ the instantaneous values of respective tensions of the tension or primary coils 1 2 3, the energy at any given instant of the rotary phase-current may be represented thus: $A = J_b \cdot E_2 - J_a \cdot E_3$. (See diagram Fig. 3.) If this scheme is applied to meters for monophase currents constructed on the Ferraris principle, it is essential that the phases of the currents $i_2$ $i_3$ in the shunts bear a ninety-degree relation with respect to the phases of their tensions $E_2$ $E_3$—i. e., the circuit across which they are shunted—in order that the meter may register correctly under varying conditions of the circuit. Consequently in motor-meters of the Ferraris type $i_2$ must be in phase with $J_a$ and $i_3$ in phase with $J_b$. Such a phase shifting can only be attained by particular knack. At any rate very great inductive resistances are needed and the phase-shifting obtained is dependent upon the frequency. If only a small phase shifting is desired, as in the present case, the necessary inductive resistances are smaller and the degree of the phase shifting obtained is less dependent upon the frequency. By my invention the necessity of a shifting of ninety degrees is obviated and in place of the same one of only thirty degrees is used. If now the phase of the shunt-current $i_3$, Fig. 3, should be shifted backward ninety degrees in its phase, the phase difference between $J_a$ and $i_3$ amounts to one hundred and twenty degrees. In the same manner a phase difference of one hundred and twenty degrees between $J_b$ and $i_2$ can be attained by shifting the tension-current $i_2$ backward ninety degrees. When the tensions employed are the same as is usually the case, it is of no importance whence the tension-currents are taken, so long as the phase difference of one hundred and twenty degrees exists between the main current which is working on a rotor and the tension-current. On account of this I can also allow the main current $J_a$ to work in conjunction with the tension $E_1$ and the main current $J_b$ with the tension $E_3$ if I shift the phase of the currents $i_1$ $i_3$ thirty degrees. In this case the instantaneous values of rotary phase-current energy can be expressed by the following equations:

$$A = J_a(-E_1)^1 - 30° - J_b(-E_3) - 30°$$

or $$A = J_b(E_3) - 30° - J_a(E_1) - 30°,$$

wherein the symbols represent instantaneous values and the expressions of the angles indicate the relative angular lag between current and tension.

The necessary phase shifting of thirty degrees can readily be accomplished with the inductances or choking-coils $i^{10}$ $i^{20}$ shown in Fig. 5, wherein the coil $a^2$ is combined with tension 1, the latter with a phase shift backward of thirty degrees, as per circuit $i^{10}$ $a_2$, and the coil $b^2$ is combined with tension 3, likewise with a backward phase shift of thirty degrees, as per circuit $i^{10}$ $b_2$.

By producing a phase shift of thirty degrees instead of ninety degrees I am enabled to employ smaller inductive resistances than heretofore and the meter is less dependent upon the frequency of alternations in the circuit, for the reason that the current strength in the shunt alters very little with the frequency of alternation by reason of the comparatively large ohmic resistance shunted into the respective current-circuit.

What I claim, and desire to secure by Letters Patent, is—

1. In an induction-meter for three-phase alternating-current systems, the combination of a pair of current or series coils and a pair of tension or shunt coils, means for shifting the phase of the currents in each tension or shunt coil backward thirty degrees with respect to its tension, and rotating means inductively acted upon by the coils and adapted to actuate a registering mechanism.

2. A three-phase wattmeter comprising a closed circuit rotating means, current-coils acting thereon and included in two of the main lines of the system and shunt-coils connected between one of the main lines in which a current-coil is included and the remaining two lines of the system and means for shifting the current-phases in the shunts thirty degrees backward with respect to their tensions.

3. A three-phase induction wattmeter device, comprising in its structure the combination of rotating means adapted to actuate a register with two pairs of coils acting inductively upon the said rotating means so as to constitute substantially a pair of motors, one coil in each pair being in series or series relation with the work-circuit and the other coil of each pair being in shunt or shunt relation with the work-circuit and means for shifting the current-phases in each shunt thirty degrees backward with respect to its tension.

4. A three-phase motor device adapted for measuring the energy in three-phase systems, comprising in its structure the combination of rotating means adapted to actuate a register and a plurality of pairs of coils acting inductively upon the said rotating means, one coil of each pair being in series or series relation with the work-circuit and the other coil of each pair being in shunt or shunt relation with the work-circuit and means for shifting the phase of the currents in the shunts backward thirty degrees with respect to their tensions.

5. A three-phase wattmeter comprising the combination of a plurality of rotors on a common shaft forming in effect a single rotor and adapted to actuate a registering device with a pair of coils acting upon each rotor, one coil of each pair being in series or series relation with the work-circuit and the other coil of each pair being in shunt or in shunt relation to the work-circuit and means for shifting the current-phases in the shunts backward thirty degrees with respect to their tensions.

GEORG HUMMEL.

Witnesses:
ERNST GLAS,
EMIL HENZEL.